United States Patent [19]

Greve et al.

[11] Patent Number: 5,469,956
[45] Date of Patent: Nov. 28, 1995

[54] MODULAR CONVEYOR BELT AND FLIGHT MEMBERS THEREFOR

[75] Inventors: Christopher G. Greve, Covington; Robert S. Lapeyre, New Orleans, both of La.

[73] Assignee: The Laitram Corporation, Harahan, La.

[21] Appl. No.: 375,960

[22] Filed: Jan. 20, 1995

[51] Int. Cl.$^6$ .................................................. B65G 15/44
[52] U.S. Cl. .................... 198/699.1; 198/801; 198/853
[58] Field of Search ..................... 198/716, 699.1, 198/801, 851, 853, 803.14

[56] References Cited

U.S. PATENT DOCUMENTS

| | | | |
|---|---|---|---|
| 1,172,042 | 2/1916 | Peterman | 198/801 |
| 1,326,896 | 12/1919 | Anderson | 198/801 |
| 1,638,267 | 8/1927 | Morehead et al. | 198/699.1 X |
| 3,127,005 | 3/1964 | Twyman | 198/801 |
| 3,895,982 | 7/1975 | Persson | 198/699.1 X |
| 4,171,045 | 10/1979 | Lapeyre | 198/699.1 X |
| 4,176,528 | 12/1979 | Frohbieter | 198/699.1 X |
| 4,729,469 | 3/1988 | Lapeyre et al. | 198/834 |
| 4,911,286 | 3/1990 | Herzke | 198/803.14 X |
| 5,165,514 | 11/1992 | Faulkner | 198/347.3 |
| 5,165,522 | 11/1992 | Uttke et al. | 198/716 |

OTHER PUBLICATIONS

Intralox Conveyor Belt Engineering Manual, 1988.

*Primary Examiner*—James R. Bidwell
*Attorney, Agent, or Firm*—James T. Cronvich

[57] ABSTRACT

An endless conveyor belt constructed of rows of pivotally interfitted modules and flight members for supporting product conveyed along inclined paths. The conveyor belt is constructed of a sequence of rows of belt modules joined by pivot rods to form a hinged joint between adjacent rows. Each belt module has a product-conveying surface on one side between a first end and a second end. Hinge elements at the ends of each row of belt modules are interleaved with the hinge elements of an adjacent row and pivotally interconnected by pivot rods through aligned apertures formed in the interleaved hinge elements to form an endless belt having an outer conveying surface and capable of articulating about a drive sprocket. The hinged flight member is preferably tent-shaped and comprises two panels extending outwardly from the conveying surface of the belt. The two panels are hingedly joined along an apical ridge and pivotally attached at two spaced apart belt rows. The pivotal attachment can be at the hinge joints of the belt or at pivots formed on the conveying surface of the belt. The hinge between the panels can be formed as a living hinge or by sets of apertured projections extending from the joined end of each panel and interconnected by a connecting hinge pin. The hinge between the panels of the flight member permits the panels to be connected to the belt at spaced apart rows by allowing the panels to flex relative to each other as they round a sprocket. With the hinged panels pivotally connected at spaced apart belt rows, unwanted tipping of the modules due to the action of the product load against the flight is lessened.

32 Claims, 6 Drawing Sheets

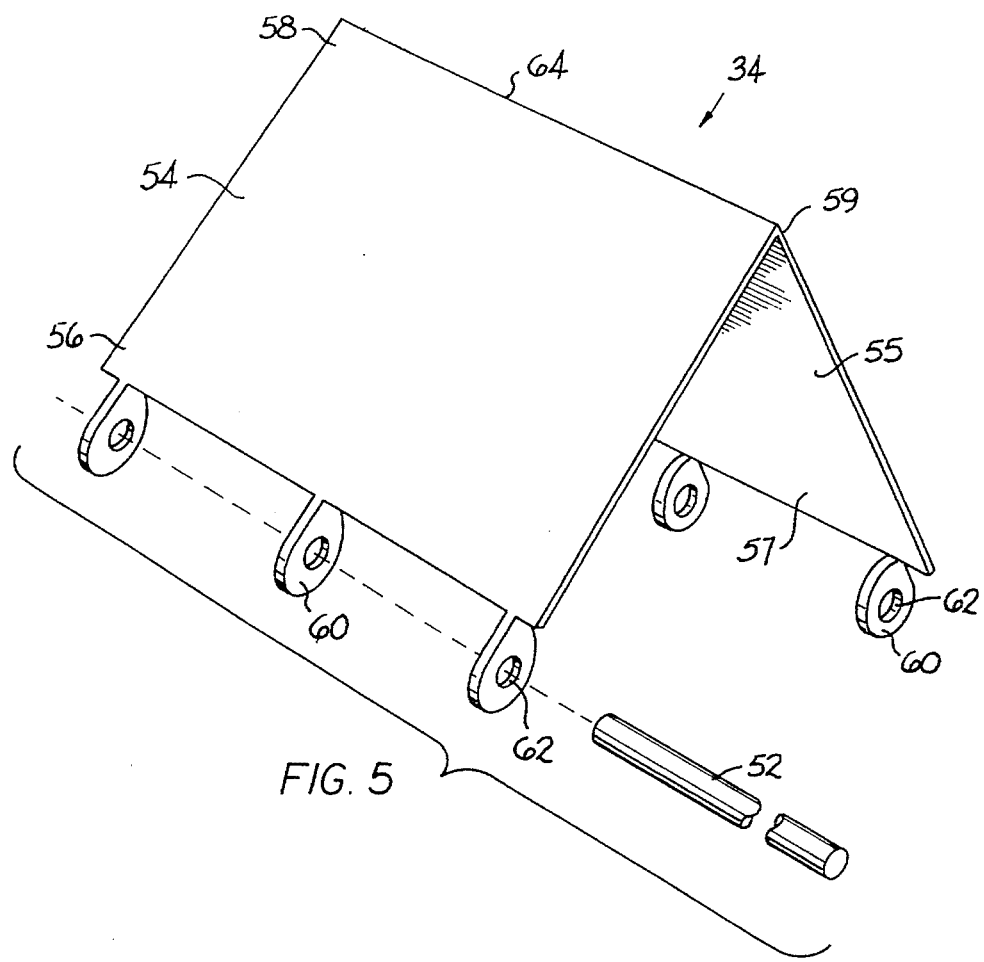
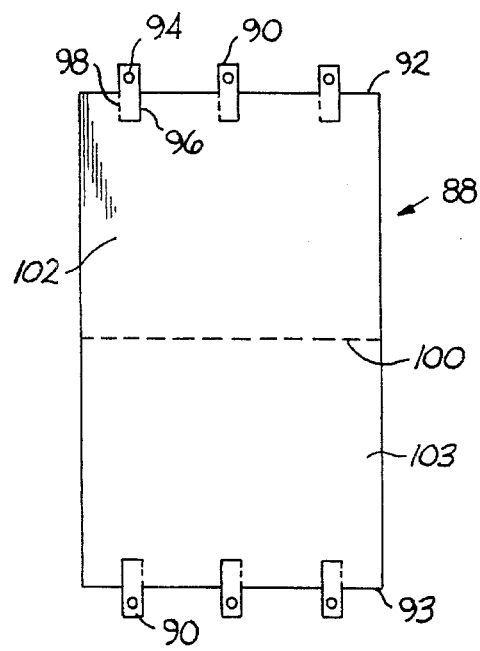
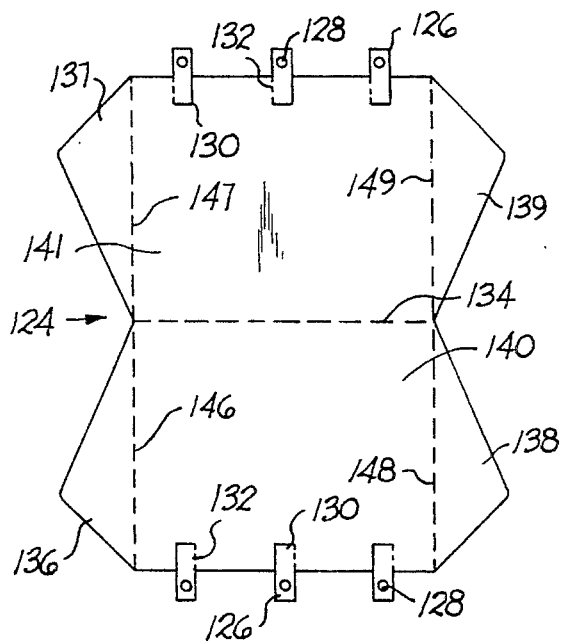

MODULAR CONVEYOR BELT AND FLIGHT MEMBERS THEREFOR

BACKGROUND

This invention relates to conveyor belts and, more particularly, to link belts constructed of rows of modules pivotally interfitted into an endless link belt and to accessories attached to the belt for conveying product along inclined paths.

Because they are positively driven by sprockets and easy to repair, modular plastic conveyor belts are used widely in place of friction-driven fabric belts. Modular plastic conveyor belts are made up of molded plastic modular links, or belt modules, that can be arranged side by side to form a belt row of selectable width. A series of spaced-apart link ends extending from the leading and trailing ends of the modules includes aligned apertures to accommodate a pivot rod. The link ends along one end of a row of modules are interfitted with the link ends of an adjacent row. A pivot rod extending through in the aligned apertures of the side-by-side and end-to-end connected modules forms a hinge between adjacent rows. Rows of belt modules are connected together by pivot rods into an endless conveyor belt capable of articulating about a drive sprocket.

Many applications require a conveyor belt to transport product along an inclined path. To prevent product from sliding down the conveying surface of a belt as it traverses an incline or decline, belt flights, or cleats, are often used. Generally, the flights in modular plastic conveyor belts are integrally formed with the body of a belt module. U.S. Pat. No. 4,729,469 to Lapeyre et al. describes an exemplary righted module molded of plastic material. The flight, in the form of a rectangular plate, extends perpendicularly from the conveying surface of the module. The plane of the flight is normal to the direction of travel of the conveyor belt to support product conveyed along an inclined path.

In belts constructed of integral flighted modules, product conveyed along an inclined path exerts a force against the flight. The force produces oppositely directed forces acting along the hinge axes at each end of the flighted module that tend to tip the module by lifting its uphill end and lowering its downhill end. With the flight tipped back, product can spill. As product spills, the force against the flight and, hence, the degree of tip change, causing jerking motion of the belt. Because the magnitude of the tipping forces at the hinges is proportional to both the force on the flight and the distance of its point of application from the plane of the hinges, the tipping problem is exacerbated with high flights and product having a high center of gravity.

One solution to the tipping problem is to outfit the conveyor with retainer guides having channels that bear against the edges of the belt to prevent modules from tipping. Shortcomings of this solution include the added expense of the retainer guides, the additional drive power required to overcome the friction of the belt edges against the retainer guides, and excessive wear of both the belt edges and the guides.

Another solution to the tipping problem is to tension the belt tightly. Tension along the line of pull of the belt counteracts the tendency of the flighted modules to tip. Consequently, belts in low tension are especially susceptible to module tip. Although flighted modules in a highly tensioned belt are unlikely to tip excessively and spill product, such belts are subject to wear and early failure.

SUMMARY

The foregoing shortcomings are avoided by the invention, which provides a modular conveyor belt constructed of a sequence of rows of belt modules joined by pivot rods to form a hinged joint between adjacent rows and a hinged flight member extending outwardly from the conveying surface of the belt. Each belt module has a first end and an opposite second end. A product-conveying surface on one side of each module extends across the width of the module between the first and second ends. First and second sets of hinge elements are spaced along the first and second ends of each module. The individual hinge elements of each set circumscribe an aperture aligned with the apertures of the other hinge elements of the same set. The belt modules are connected end to end in rows with the first set of hinge elements along one row interleaved with the second set of hinge elements of an adjacent row to form an endless belt with an outer conveying surface. Pivot rods journalled in the aligned apertures of the interleaved hinge elements form a hinged joint between adjacent rows of modules. Each flight member includes a first panel and a second panel extending outwardly from the conveying surface of the belt. The first panel has opposing first and second ends with attachment means at the first end for attaching the panels to the belt. The first end of the first panel is attached to the belt at a first row of belt modules, while the first end of the second panel is attached at a second row of belt modules. The second ends of the panels are joined at a hinge that permits the panels to flex relative to each other. With the ends of the panels of the flight member connected at locations spaced apart by more than one row of belt modules, the tipping forces act on non-consecutive hinged joints, unlike in belts made of integral righted modules. The increased spacing between the axes of the joints acted on by the tipping forces decreases the magnitude of the tipping forces and the degree of tip for a given load. The hinge joining the first and second flight panels allows the belt to articulate about a drive sprocket without buckling. The change in separation between the attachment points of the panels as the belt goes around a sprocket is accommodated by flexure of the hinged flight member. The reduction in the tipping force afforded by the hinged flight makes it especially useful as a high flight, which is subject to a greater tipping moment.

The flight member can be constructed in a number of ways. For example, in one version, the first panel and the second panel are of roughly the same dimensions, thereby providing equally sloped product-support surfaces for bidirectional belt operation. As an alternative, the outer surface of the first panel is arranged to lie in a plane perpendicular to the direction of belt travel to provide a vertical product-support surface.

The hinge joining the panels can be constructed as a living hinge or as a conventional hinge with a hinge pin. For example, the flight member can be tent-shaped with each panel forming a side of the tent and jointed at a junction of the second ends to form a transverse apical ridge along which the panels flex. In a version having a living hinge, the flight member comprises a single sheet of material, such as a thin sheet of stainless steel, folded along a fold line between the ends of the sheet. The fold line defines the junction of the first and second panels. The fold forms a living hinge that allows the panels to flex relative to each other. In another version with a living hinge, the sheet, such as a molded plastic sheet, is made of a generally thicker material with a thinner region formed across the width of the sheet along the junction of the first and second panels to provide a flexible joint between the panels.

In yet another hinged version of the flight member, the first panel and the second panel each have a row of apertured projections at their second ends. The two rows of apertured projections are interleaved and a connecting pin is extended through the interleaved, apertured projections to join the panels and form a hinge along the junction.

To reduce the magnitude of the tipping forces acting along the hinge axes, the flight members can be attached to the belt at different rows of modules. In one version, the first attachment means of the first panel comprises a first row of transversely spaced projections forming aligned bores. The projections of the first row are intercalated with the interleaved hinge elements of a first hinged joint of the belt. The pivot rod at the first hinged joint extends through the bores of the first row of projections to pivotally retain the first panel of the flight member at the first hinged joint. The second attachment means is similarly constructed at an end of the second panel and is similarly attached to the belt at a second hinged joint. Because the magnitudes of the oppositely directed tipping forces are inversely proportional to their separation, the tipping forces are reduced by increasing the spacing between the joints at which the panels are attached. To increase the wear life of the pivot rod at the attachment joint, a stainless steel pivot rod can be used.

In another version of the modular conveyor belt, the flight members are attached along the conveying surface of the belt between the hinged joints. In this version, the first row and the second row of belt modules at which the flight member is attached each include selected belt modules having a flight support disposed across the width of the conveying surface. The flight support comprises a rodlet supported by a pair of retainers spaced apart transversely across the belt. Each of the retainers has retaining structure to support an end of the rodlet suspended between each of the pair of retainers. The rodlet, suspended parallel to the pivot rods at the hinged joints, pivotally engages the attachment means of the flight member to pivotally support the flight member at the first and second rows of the belt. In this version, belt pull strength is not affected by the attachment of the flight member to the belt.

Other features provided in various versions include flight members with one or more side guards extending obliquely from the sides of the panels to act as shields against dirt and other debris or as side guards to form a bucket with the panels to retain product better.

DRAWINGS

These and other features, aspects, and advantages of the invention are further explained by the following description, appended claims, and accompanying drawings in which:

FIG. 5 is a perspective view of one version of the flight members of FIG. 1;

FIG. 7 is a plan view of a sheet of material from which one version of the flight members of FIG. 1 can be constructed;

FIG. 9 is a plan view of a sheet of material from which another version of the flight members of FIG. 1 can be constructed;

DESCRIPTION

Figure 1:
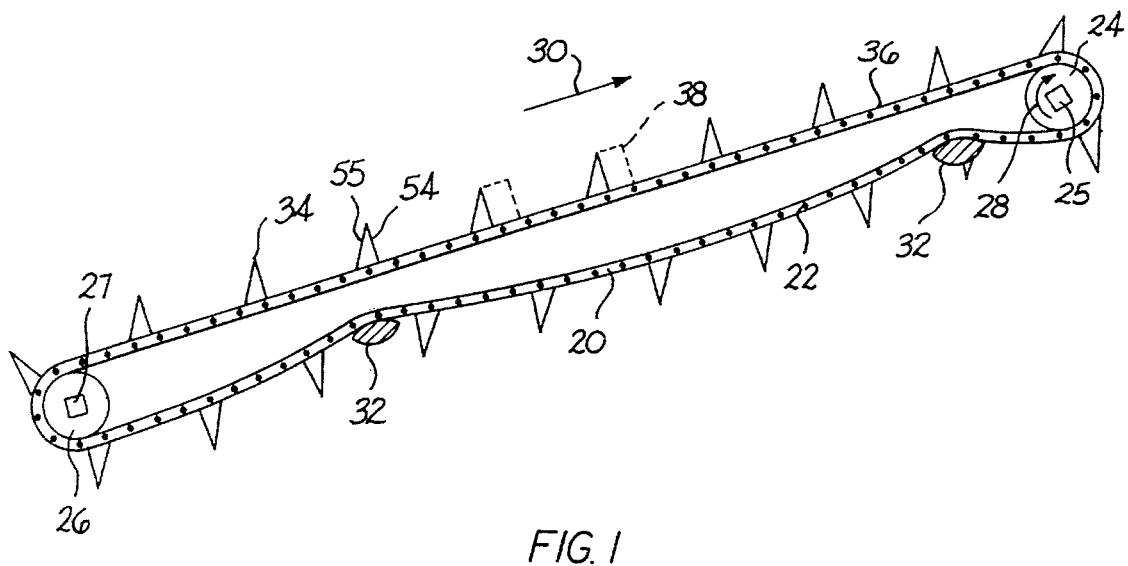
FIG. 1 is a side elevation schematic view of an incline conveyor using a flighted belt in accordance with the invention.

A side view of a flighted conveyor belt 20 according to the invention is shown in FIG. 1 in an incline conveyor installation. The belt 20 comprises a plurality of rows of belt modules pivotally interconnected by transverse pivot rods 22 into an endless belt loop. The pivot rods 22 serve as hinge pins at the interconnections between adjacent end-to-end connected belt rows that allow the belt to articulate about a drive sprocket 24 at the upper end of the inclined path and an idle sprocket 26 at the lower end. Teeth on the periphery of the sprockets 24, 26 positively engage structure in the inner surface of the belt 20. The drive sprocket 24 is mounted on a drive shaft 25 and rotated by a motor (not shown) in the direction of curved arrow 28 to pull the belt 20 up the incline in a direction of travel 30. (Of course, it is also possible to reverse the rotation of the motor to reverse the direction of travel of the belt.) The belt loop is routed over shoes 32 that take up slack in the belt 20 to minimize sag in the return path. The belt 20 is wrapped around the idle sprocket 26, which is mounted on a shaft 27 rotationally supported by bearings (not shown). Flight members 34 extend outward from the outer conveying surface 36 of the belt 20 to support product 38 as it is transported up the incline. As depicted in FIG. 1, but illustrated in more detail in FIGS. 2–4, the flight members are attached to the belt 20 at spaced apart rows.

Figure 2:
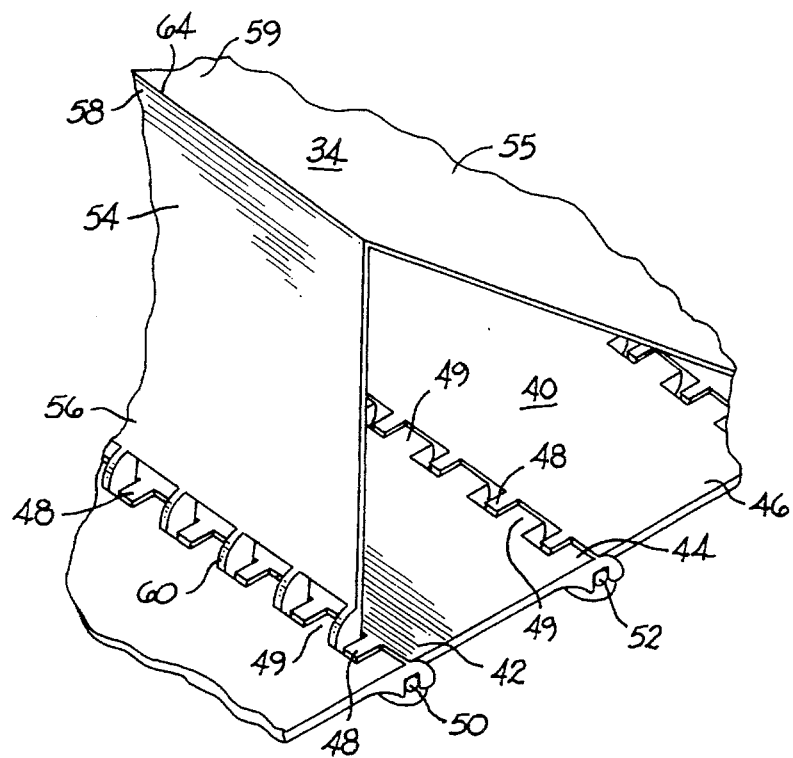
FIG. 2 is a fragmentary perspective view of a portion of the flighted belt of FIG. 1.

As FIG. 2 shows, each belt module 40 has a first end 42 and a second end 44 and a conveying surface 46 extending across the width of the module between the first and second ends. The modules 40 are preferably molded of plastic, but could also be made of metal or a ceramic material. Hinge elements, or link ends, of a first set 48 are spaced along the first end 42 of each module 40. Hinge elements of a second set 49 are spaced across the second end 44 of each module 40. The hinge elements 48, 49 circumscribe an aperture 50. The apertures 50 of all the hinge elements 48, 49 of each set are aligned to accommodate a pivot rod 52. Adjacent modules 40 are connected end-to-end in rows with the first set of hinge elements 48 along one row interleaved with the second set of hinge elements 49 of an adjacent row to form the belt 20. The pivot rods 52 journalled in the aligned apertures 50 of interleaved sets of hinged elements 48, 49 form a hinged joint between adjacent rows of belt modules 40. Details of the flight members 34 are shown in FIGS. 2 and 5. In FIG. 2, the flight member 34, which extends outwardly from the conveying surface 46, includes a first panel 54 with a first end 56 and an opposite second end 58. Attachment means in the form of projections 60 spaced along the first end 56 of the first panel 54 are used to attach the first panel to the belt 20 along a row of belt modules 40. The projections 60 include aligned bores 62 to accommodate the pivot rods 52 interconnecting the belt modules 40 at the hinged points. The projections 60 are intercalated with the hinge elements 48, 49 at a hinge joint and pivotally retained by the pivot rod 52 extending through the aligned bores 62 and apertures 50. The pivot rod 52 can be made of a number of appropriate materials, but is generally made of extruded or molded plastic or of stainless steel for additional wear resistance. The flight member 34 includes a second panel 55 with a first end 57 and an opposite second end 59. Similar projections 60 at the first end 59 are used to attach the second panel 55 pivotally to another row of belt modules 40. The second ends 58, 59 of the panels 54, 55 are connected together along an apical ridge 64 to form a tent-shaped flight member 34.

Figure 3:
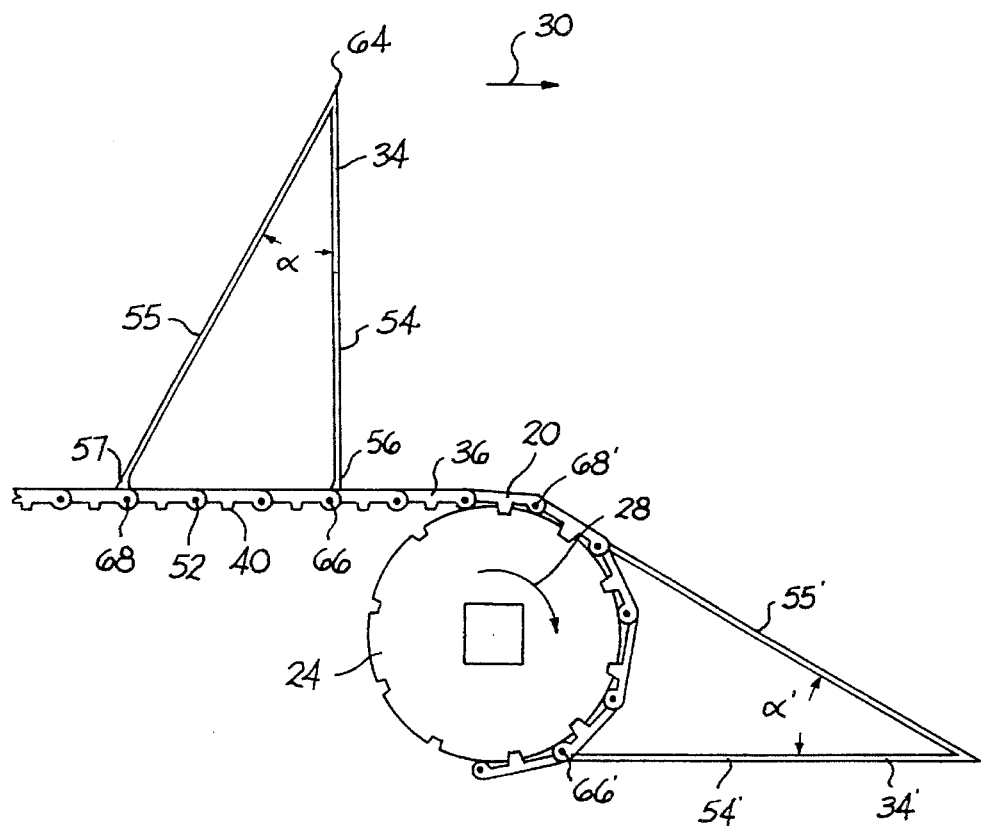
FIG. 3 is a partial side elevation view of a portion of a flighted belt as in FIG. 1 showing the flexure of the flight member as the belt articulates about a sprocket.
Figure 4:
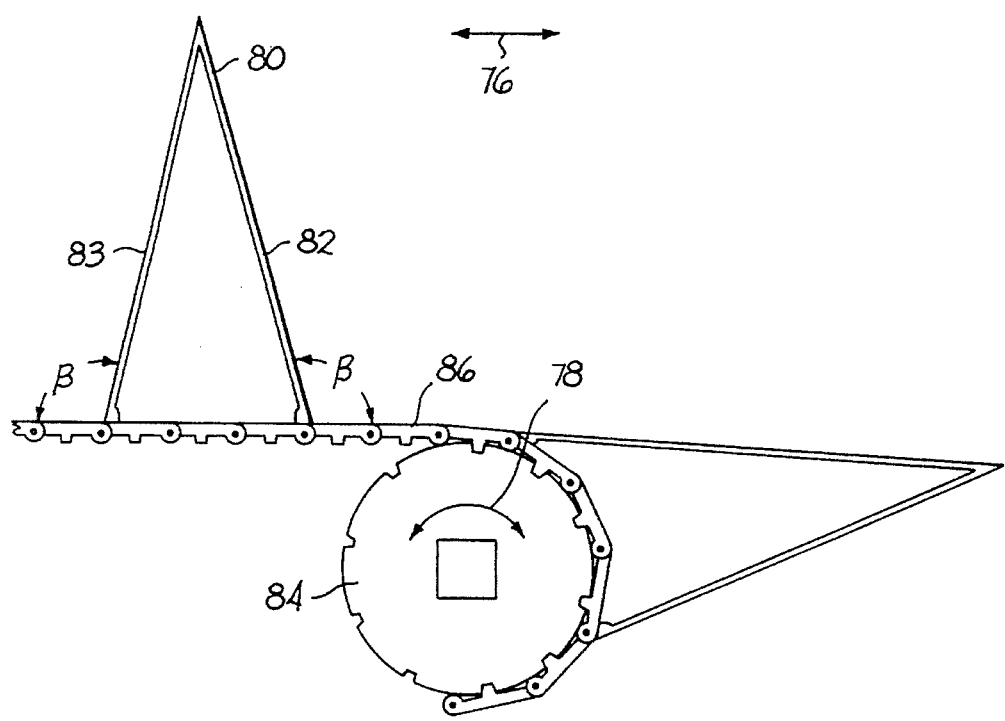
FIG. 4 is a partial side elevation view as in FIG. 3 illustrating a flight member having an alternative geometry.

As shown in FIG. 3, the first panel 54 and the second panel 55 serve as sides of a tent-shaped flight member 34. The junction of the second ends 58, 59 of the panels 54, 55 forms an apex angle α between the panels. As the flight member 34 moves along the linear conveying path, the angle α remains relatively constant as determined by the sum of the pitches of the belt rows forming the base of the tent-shaped flight. The pitch is the distance between consecutive hinge joints, or pivot rods 52. In the belt construction of FIG. 3, the flighted member 34 is attached to the belt 20 at hinge joints 66, 68 separated by four rows. As forward flighted member 34' articulates about the sprocket 24, the straight line distance between the articulating hinge joints 66', 68' is less than on the conveying path. For this reason, the first panel 54' must be able to flex relative to the second panel 55' Consequently, the junction of the first and second panels 54, 55 forms a hinge at the ridge 64. In this way the apex angle α' can change as the flight member 34' articulates about the sprocket 24.

Figure 6:
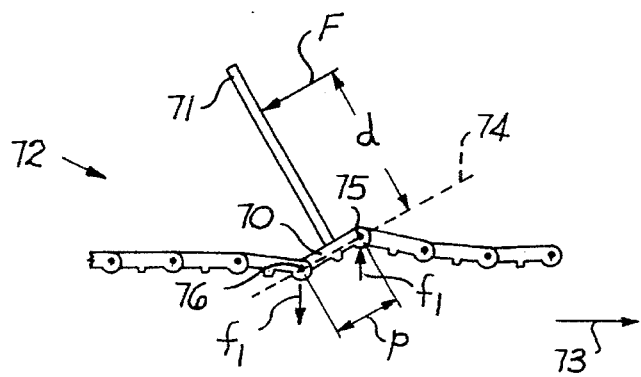
FIG. 6 is a combination side elevation view of a conventional modular conveyor belt having righted modules and a force diagram depicting tipping forces acting on the flight module.

The advantages of the tent-shaped flight member 34 over conventional integrally molded flighted modules can be appreciated by reference to FIG. 6. A conventional righted module 70 having a flight 71 forms one row of a conveyor belt 72 traveling in the direction of arrow 73. A load carried by the belt 72 and supported by the flight 71 exerts a force F against the flight. The force F acting on the flight 71 a distance d from a plane 74 containing the pivot axes 75, 76 of the module 70 causes oppositely directed $f_1$ to act on each end of the module. The upward force $f_1$ acting on the uphill pivot axis 75 and the downward force $f_1$ acting on the downhill pivot axis 76 cause the module 70 to tip as depicted in FIG. 6. The magnitude of the tipping force $f_1$ acting on each pivot axis 75, 76 is given by $f_1=F_d/p$, where p, the pitch of the module 70, is the distance between the lines of application of the tipping force. As seen from the force equation, heavy loads (large F) acting high up on high flights (large d) greatly increase $f_1$ and thereby the degree of tip. It can be seen that tipping is lessened in belts made of modules of larger pitch p, but that is not a practical solution in all applications. With the flight numbers 34 of FIG. 3, which are attached along pivot axes 66, 68 spaced apart by four belt rows, the tipping force exerted at those axes is reduced to one-fourth the magnitude of the force $f_1$ in the sheet 72 in FIG. 6 for the same tipping moment (Fd). Although the flight members of FIG. 3 span four belt rows, it should be appreciated that the spacing could differ in different applications.

In the version of FIG. 3, the first panel 54, generally operated as the leading panel, extends substantially perpendicularly from the conveying surface 36. The second panel 55 is consequently longer than the first panel 54. In another version better suited for bidirectional belt operation and depicted in FIG. 4, a flight member 80 comprises a first panel 82 and a second panel 83 of substantially identical dimensions to form an isosceles tent. As the sprocket 84 is rotated in either direction 78, it drives the belt 86 bidirectionally as indicated by two-headed arrow 76. The surfaces of the flight member 80 present an identical attack angle β to the product regardless of the direction of belt travel. Of course, geometries other than right and isosceles triangles can be used to fit other applications.

The tent-shaped flight member 34, 80 can be made from a sheet of material, such as a thin sheet of stainless steel. The flat sheet 88 shown in FIG. 7 has a number of projections 90 at opposite edges 92, 93. A hole 94 is punched in each projection 90. L-shaped seams 96 are cut in the sheet 88 from the edge 92, 93 where it meets one side of the projections 90. The projections 90 and the adjoining sheet material bounded by the seams 96 are bent along bend lines 98 at an angle of 90° from the sheet to form ears with aligned holes 94. The sheet 88 is further folded along a transverse fold line indicated by broken line 100. The fold line 100 is intermediate the edges 92, 93. It can be positioned midway to produce a flight member 80 as in FIG. 4 or closer to one edge to form a flight member 34 as in FIG. 3. The fold line 100 separates the sheet 88 into two panels 102, 103. A thin sheet of stainless steel can be used to provide support strength and flexibility at the living hinge formed along the fold line 100. The ears formed by the bent projections 90 are intercalated with the hinge elements at hinge joints between conveyor belt rows and pivotally interconnected there by pivot rods. Instead of being integrally formed from the sheet material, projections can alternatively be formed as individual, separate inserts welded or otherwise fastened at the edges of the sheet. In this way, each projection can be wider than the thickness of the sheet to better distribute the forces beating against the pivot rod. The increased bearing surface along the bore wall of the projection insert facilitates the use of less expensive plastic, rather than stainless steel, pivot rods.

Figure 8:
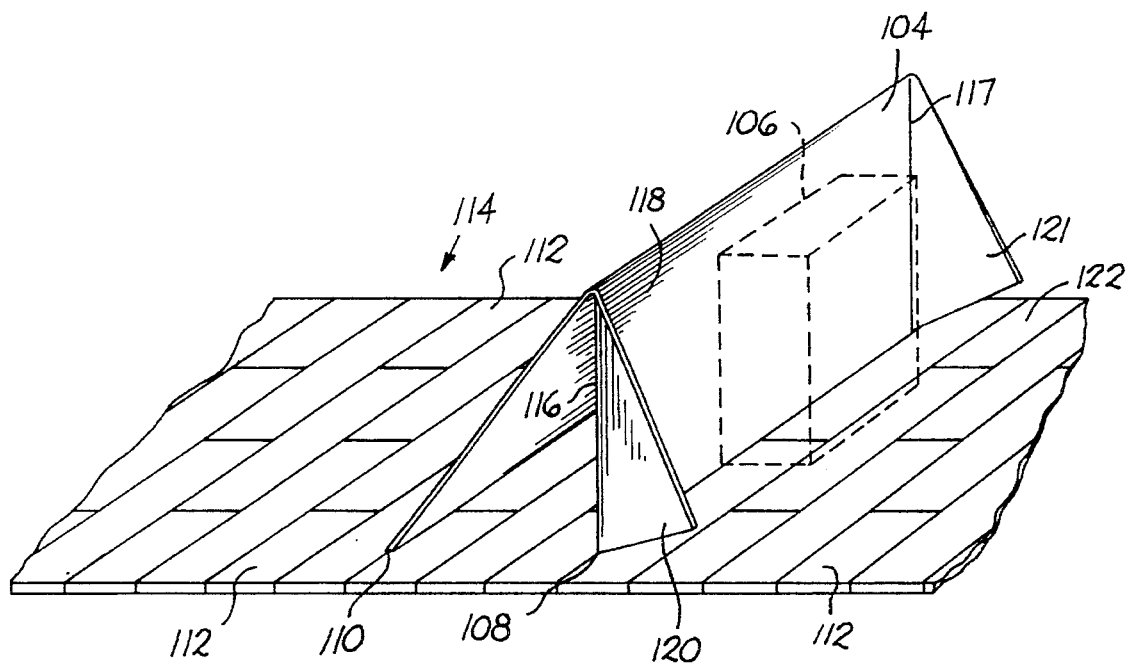
FIG. 8 is a fragmentary perspective view of a portion of the conveyor belt of FIG. 1 illustrating a further version of the flight member better adapted to retaining product.

Some applications require that conveyed product be supported along the sides of the belt as well as in the direction of transport. The conveyor belt section of FIG. 8 shows a flight member 104 supporting product 106 along a conveyor carryway. The flight member 104 is pivotally attached at first and second hinge joints 108, 110 spaced apart by a few rows of bricklayed belt modules 112 of various widths used to construct a belt 114 of a selected width. Extending obliquely from each side 116, 117 of a forward panel 118 of the flight member 104 is a side guard 120, 121. The side guards 120, 121 retain product 106 on the conveying surface 122 of the belt 114. It should also be noticed that the flight member 104 does not extend all the way to the edge of the belt 114. In this way, the conveying surface 122 along the edges of the belt 114 is available as a beating surface against a roller or shoe positioned along the belt edge under the returnway to decrease sagging (as in FIG. 1).

The sheet 124 of FIG. 9 illustrates another simple construction of a tent-shaped flight member, such as that shown in FIG. 8, having side guards. The sheet 124 shown has a number of projections 126, a hole 128 punched in each. L-shaped seams 130 are cut so that ears with aligned bores formed by the holes 128 can be, formed by the projections 126 bent from the sheet 124 along the lines indicated by dashed lines 132. The sheet 124 is folded transversely along a fold line 134 to form the tent shape. The fold line 134 joins first and second panels 140, 141. Tabs 136, 137, 138, 139 extend from the sides of the panels 140, 141. The tabs 136, 137, 138, 139 can be folded along an associated fold line 146, 147, 148, 149 to form side guards. If they are folded toward the outer surfaces of the tent-shaped panels 140, 141, the tabs form product-retaining side guards as in FIG. 8. If they are folded inward toward each other in the nature of tent flaps, the tabs 136, 137, 138, 139 can form side guards for shielding the interior of the tent-shaped flight from contamination by dirt and other debris. Of course, the tabs are optional in any combination and their shapes, although triangular in the example of FIG. 9, could be different in other applications. Likewise, the squared-off edges of the projections 126 and the L-shaped seams 130 are for purposes of example only. Typically, they would be rounded.

Figure 10:
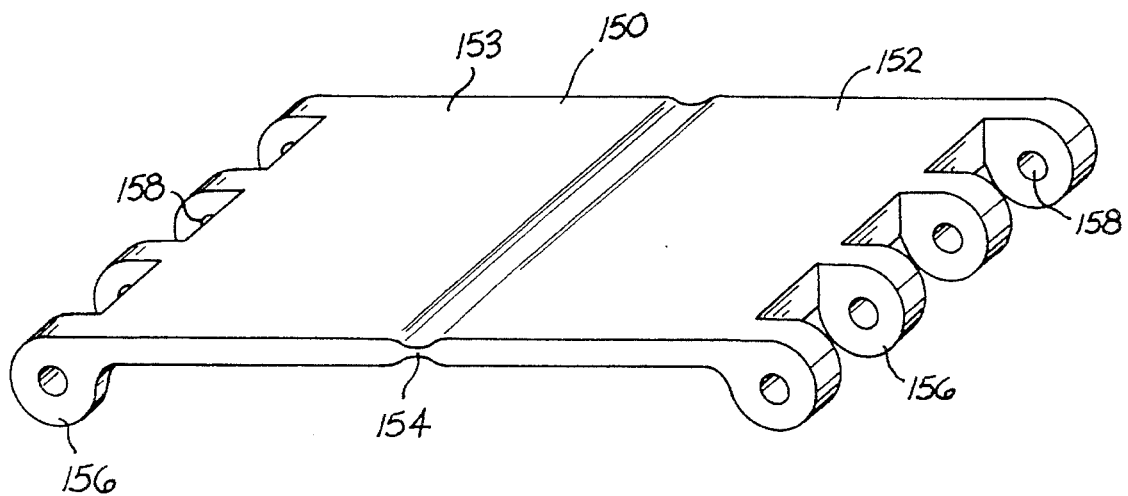
FIG. 10 is a perspective view of another version of the flight members of FIG. 1 in which the flight member is molded of a plastic material.

Besides being formed of a thin sheet of metal, such as stainless steel, the flight members can be, as another example, integrally molded into a plastic sheet as shown in FIG. 10. The sheet 150 can be formed by injection molding, the same process typically used to form plastic conveyor belt modules. The sheet 150 is divided into two panels 152, 153 of generally uniform thickness by a thin connecting region 154. The thin region 154 forms a living hinge about which the two panels 152, 153 can be folded flexibly to form a hinged flight member with good product support. First and second rows of projections 156 at opposite ends of the sheet 150 have aligned bores 158 that admit a pivot rod for a hinged attachment at the hinged joints of a conveyor belt.

Figure 11:
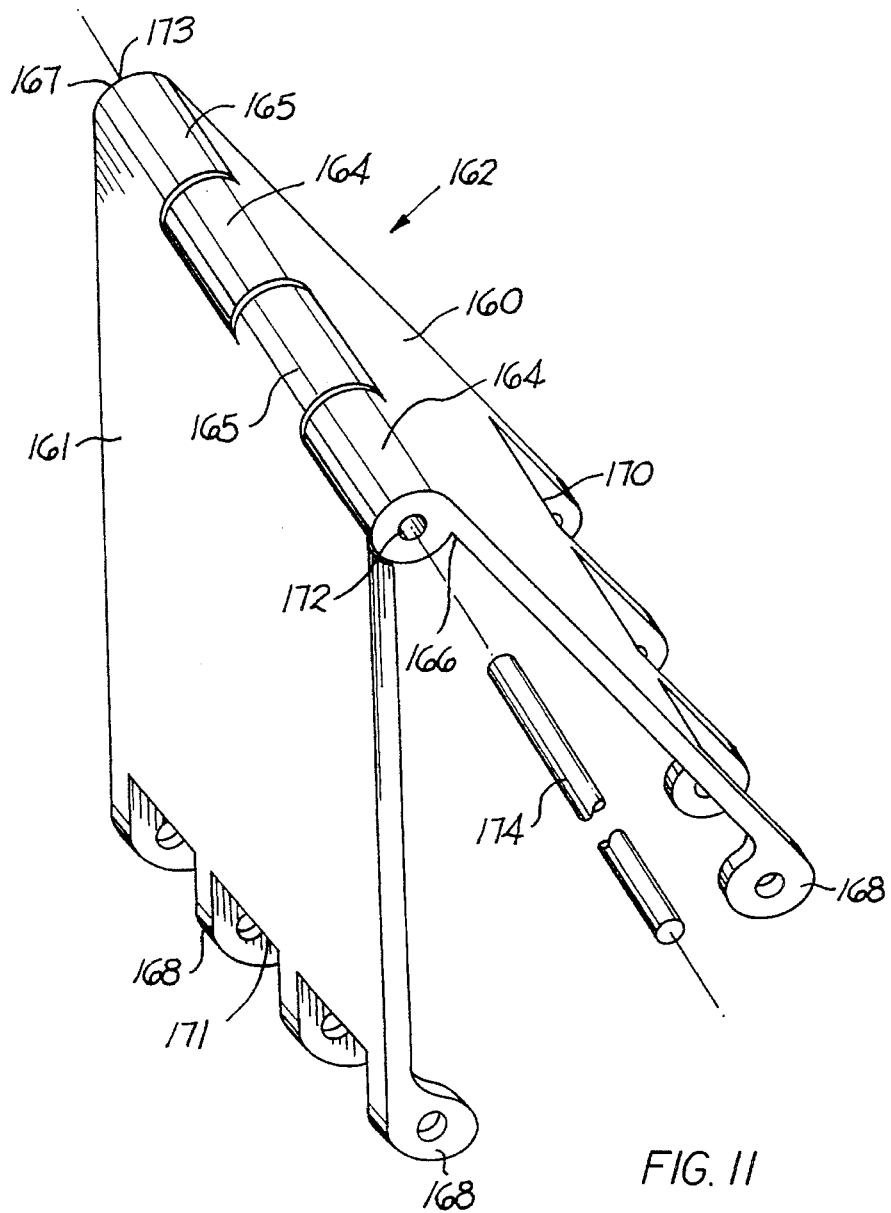
FIG. 11 is a perspective view of yet another version of the flight members of FIG. 1.

The hinge between the panels 160, 161 of a tent-shaped flight member 162 in the version illustrated in FIG. 11 is formed not by a living hinge, but by apertured projections 164, 165 formed at the second ends 166, 167 of the panels. Projections 168 at first ends 170, 171 of the panels 160, 161 are used to attach the hinged flight 162 to a conveyor belt. A connecting pin 174 extends through the aligned apertures 172, 173 of the projections 164, 165 at the second ends 166, 167 of the panels 160, 161 to form a hinge between the panels. In this example, each panel 160, 161 has a pair of projections 164, 165. This version could be formed of injection-molded plastic or cast aluminum, for example.

Figure 12:
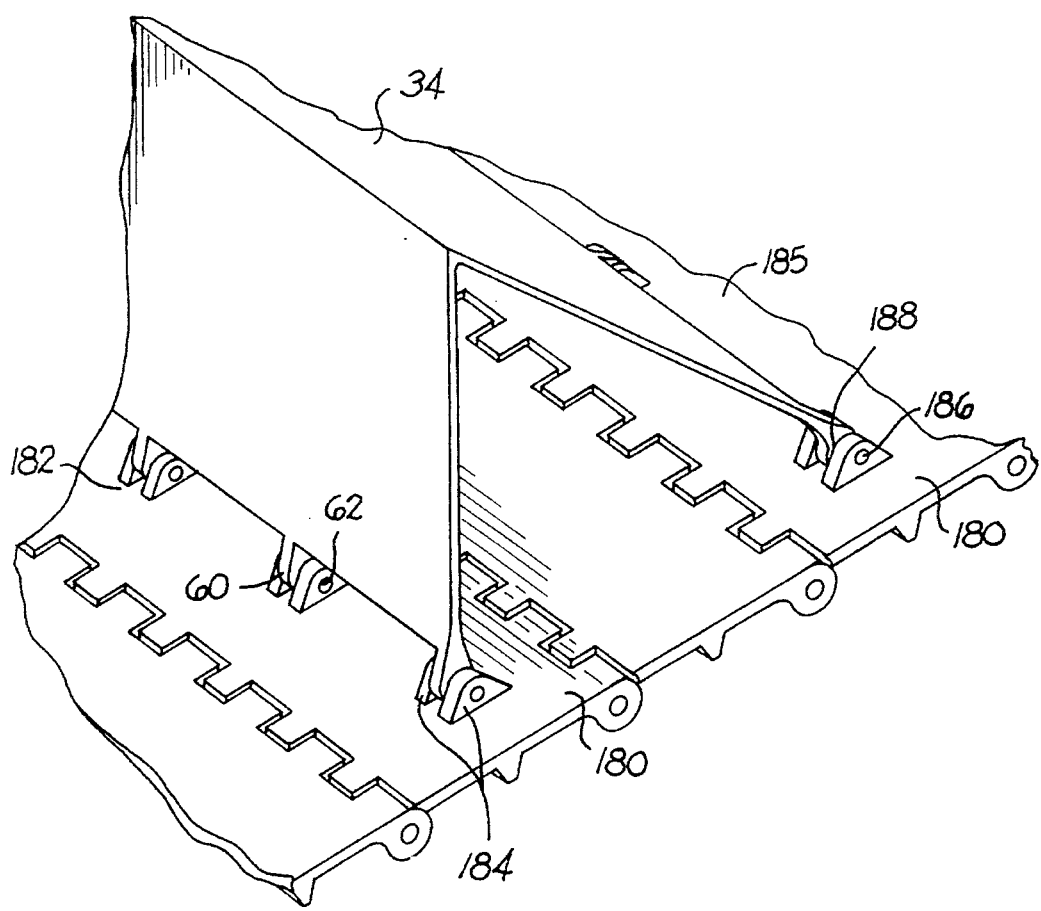
FIG. 12 is a fragmentary perspective view of a conveyor belt showing another embodiment of FIG. 1 in which the flight member is attached along the conveying surface of the belt.
Figure 13:
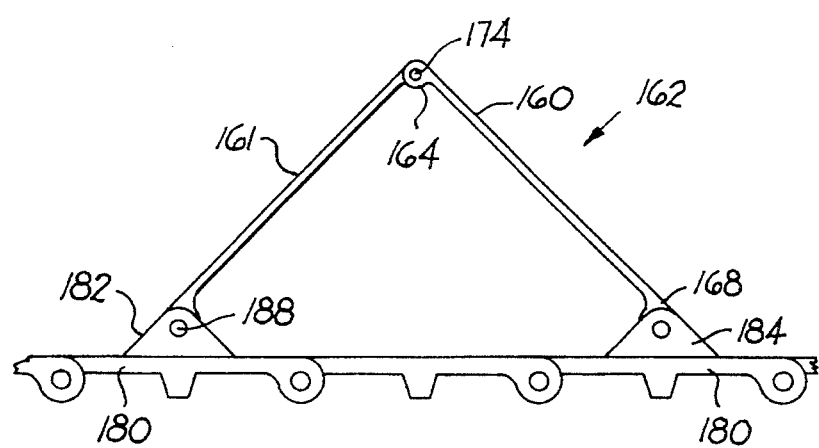
FIG. 13 is a side elevation view of a portion of a conveyor belt having a flight member as in FIG. 11 attached to the belt as in FIG. 12.

Another way of attaching the flight members to the belt is shown in FIG. 12. In this version, selected belt modules 180 along the rows of attachment include flight supports 182 consisting of pairs of raised retainers 184 spaced apart across the width of the row along the conveying surface 185. The walls of apertures 186 formed in the retainers 184 support and retain the ends of a rodlet 188 suspended between each of the pair of retainers. The projections 60 of the flight member 34 intermesh with the retainers 184 and are pivotally retained by the rodlets 188 extending through the bores 62 in the projections. A similar attachment scheme is shown in FIG. 13 using the flight member 162 of FIG. 11. The advantage of pivotally attaching the flight members to the conveying surface of spaced apart belt rows rather than at the hinged joints is to avoid decreasing the pull strength of the belt. With the flight members attached along the conveying surface, hinge elements of the belt modules do not have to be removed or narrowed to make room for the intercalated attachment projections of the flight members.

Consequently, the longitudinal belt tension is distributed over more or thicker hinge elements, and the pull strength of the belt is unaffected.

Although the invention has been described in considerable detail with reference to certain preferred versions, flight geometries, and construction methods, other versions are possible. For example, the surfaces of the panels of the flight need not be planar. As other examples, the flight supports could be recessed into the conveying surface of the belt, or a single rodlet could extend through all of the aligned bores of the projections at an edge of the flight member. Furthermore, an easy-to-replace, non-hinged flight member attachable at consecutive hinge joints of a conveyor belt could be constructed with the tent-shaped geometry of the described flights. Therefore, the spirit and scope of the claims should not be limited to the description of the preferred embodiments contained herein.

What is claimed is:

1. A modular conveyor belt suitable for conveying product in a direction of travel, comprising:

a plurality of belt modules, each module having a first end and an opposite second end spaced from the first end in the direction of travel, a conveying surface disposed on one side of the module between the first and second ends and extending transversely across the width of the module, and a first set of hinge elements transversely spaced along the first end of the module and a second set of hinge elements transversely spaced along the second end, each of the hinge elements of each of the sets circumscribing an aperture aligned with the apertures of the other hinge elements of the same set, the belt modules connected end-to-end in rows with the first set of hinge elements along one row interleaved with the second set of hinge elements of an adjacent :row to form an endless conveyor belt having an outer conveying surface;

a plurality of pivot rods journalled in the aligned apertures of interleaved sets of hinge elements to form a hinged joint between adjacent rows of belt modules; and a flight member extending outwardly from the outer conveying surface of the belt and including:
a first panel having a first end and an opposite second end and having first attachment means disposed at the first end for attaching the first panel at a first row of belt modules,
a second panel having a first end and an opposite second end and having second attachment means disposed at the first end for attaching the second panel at a second row of belt modules, and
hinge means hingedly joining the; second end of the first panel to the second end of the second panel.

2. A modular conveyor belt according to claim 1 wherein the first panel includes an outer surface lying in a plane perpendicular to the direction of belt travel.

3. A modular conveyor belt according to claim I wherein the first panel and the second panel have substantially the same dimensions.

4. A modular conveyor belt according to claim 1 wherein the first panel and the second panel each comprise substantially planar outer surfaces.

5. A modular conveyor belt according to claim 1 wherein the flight member comprises a single sheet of material folded along a transverse fold line defining the junction of the first panel and the second panel, the hinge means comprising a living hinge capable of flexing about the fold line.

6. A modular conveyor belt according to claim 1 wherein the first panel and the second panel flex relative to each other about the hinge means as the conveyor belt articulates about a sprocket.

7. A modular conveyor belt according to claim 1 wherein the flight member extends across at least a portion of the width of the belt.

8. A conveyor belt according to claim 1 wherein the first attachment means comprises a first row of transversely spaced projections forming aligned bores and the second attachment means comprises a parallel second row of transversely spaced projections forming aligned bores, the first row of projections being intercalated with the interleaved hinge elements of a first hinged joint and the second row of projections being intercalated with the interleaved hinge elements of a second hinged joint, the pivot rod at the first hinged joint extending through the bores of the first row of projections and the pivot rod at the second hinged joint extending through the bores of the second row of projections to pivotably retain the flight member at the first and second hinged joints.

9. A modular conveyor belt according to claim 8 wherein the pivot rods at the first and second hinged joints are made of a durable material such as stainless steel.

10. A modular conveyor belt according to claim 8 wherein the first hinged joint and the second hinged joint are spaced apart by more than one row of belt modules.

11. A modular conveyor belt according to claim 1 wherein the first panel and the second panel are joined at a junction along the second ends of the panels to form a tent-shaped body having a transverse ridge with an apex angle α.

12. A modular conveyor according to claim 11 wherein the apex angle α changes as the conveyor belt articulates about a sprocket.

13. A modular conveyor belt according to claim 11 wherein the first panel, the second panel, and the hinge means are formed from a single sheet of material folded along a line defining the junction of the first panel and the second panel, the hinge means comprising a fold at the junction of the first and second panels forming a living hinge along the transverse ridge about which the first and second panels can flex relative to each other.

14. A modular conveyor belt according to claim 11 wherein the first panel comprises a transverse row of apertured projections at the second end of the first panel and wherein the second panel comprises a transverse row of apertured projections at the second end of the second panel and wherein the apertured projections of the first panel are interleaved with the apertured projections of the second panel, and wherein the hinge means further comprises a connecting pin extending through the interleaved apertured projections and joining the apertured projections of the first and second panels hingedly at the transverse ridge.

15. A modular conveyor belt according to claim 1 wherein the flight member further comprises a side guard extending obliquely from a side of at least one of the first and second panels between the first end and the second end.

16. A modular conveyor belt according to claim 1 wherein the first row and the second row of belt modules at which the flight member is attached each include selected belt modules comprising a flight support disposed across the width of the conveying surface intermediate the first and second sets of hinge elements of the selected belt modules for engaging the first and second attachment means to support the flight member at the first and second rows of belt modules.

17. A modular conveyor belt according to claim 16 wherein the flight support comprises:
 a rodlet; and
 a pair of retainers spaced apart transversely across the belt, each of the retainers having retaining structure to support an end of the rodlet suspended between each of the pair of retainers parallel to the pivot rods at the hinged joints, the rodlet pivotably engaging the attachment means of the flight member to pivotably support the flight member at the first and second rows of the belt.

18. A flight member suitable for use in a modular conveyor belt constructed of a sequence of rows of belt modules hingedly connected end-to-end at hinged joints by pivot rods to form an endless conveyor belt, the flight member comprising:
 a first panel having a first end and an opposite second end and having first attachment means disposed at the first end for attaching the first panel at a first row of belt modules;
 a second panel having a first end and an opposite second end and having second attachment means disposed at the first end for attaching the second panel at a second row of belt modules; and
 hinge means hingedly joining the second end of the first panel to the second end of the second panel.

19. A flight member according to claim 18 wherein the first panel, the second panel, and the hinge means are formed from a single sheet of material folded along a line defining the junction of the first panel and the second panel, the hinge means comprising a living hinge capable of flexing about the fold line formed along the junction.

20. A flight member according to claim 19 wherein the first panel and the second panel are of a generally uniform thickness that is thicker than the thickness of the sheet of material along the fold line.

21. A flight member according to claim 18 wherein the first panel and the second panel have substantially the same dimensions.

22. A flight member according to claim 18 wherein the length of the first panel between the first end and the second end is less than the corresponding length of the second panel.

23. A flight member according to claim 18 wherein the first panel and the second panel each include a substantially planar outer surface.

24. A flight member according to claim 18 wherein the first attachment means comprises a first row of projections spaced along the first end of the first panel and forming aligned bores and wherein the second attachment means comprises a parallel second row of projections spaced along the first end of the second panel and forming aligned bores, the aligned bores being sized to accommodate a pivot rod.

25. A flight member according to claim 18 wherein the first panel further includes a row of apertured projections along the second end of the first panel and wherein the second panel further includes a row of apertured projections along the second end of the second panel and wherein the apertured projections along the second end of the first panel are interleaved with the apertured projections along the second end of the second panel, and wherein the hinge means comprises a connecting pin extending through the interleaved apertured projections and hingedly joining the apertured projections of the first and second panels.

26. A flight member according to claim 18 further comprising a side guard extending obliquely from a side of at least one of the first or second panels between the first end and the second end.

27. A tent-shaped flight member suitable for use in a conveyor belt, comprising:

a sheet of material having a first edge and an opposite second edge;

first attachment means extending from the first edge of the sheet for attaching the first edge of the sheet to a conveyor belt;

second attachment means extending float the second edge of the sheet for attaching the second edge of the sheet to a conveyor belt;

the sheet being folded about a fold line intermediate the first and second edges to form a tent-shaped flight member having a living hinge about which the sheet can flex.

28. A tent-shaped flight member according to claim 27 wherein the sheet is made of stainless steel.

29. A tent-shaped flight member according to claim 27 wherein the first attachment means comprises a first row of projections spaced along the first edge of the sheet and forming a first set of aligned bores and wherein the second attachment means comprises a parallel second row of projections spaced along the second edge of the sheet and forming a second set of aligned bores.

30. A tent-shaped flight member according to claim 27 wherein the fold line is formed closer to the first edge than to the second edge of the sheet.

31. A tent-shaped flight member according to claim 27 wherein the sheet is molded of a plastic material and wherein the sheet includes a thin region about the fold line to facilitate flexing.

32. A tent-shaped flight member according to claim 27 further comprising a tab extending obliquely from a side of the sheet between the first edge and the second edge to form a side guard.

* * * * *